United States Patent [19]

Buchta

[11] Patent Number: 4,582,553
[45] Date of Patent: Apr. 15, 1986

[54] PROCESS FOR MANUFACTURE OF REFRACTORY HARD METAL CONTAINING PLATES FOR ALUMINUM CELL CATHODES

[75] Inventor: William M. Buchta, Baltimore, Md.

[73] Assignee: Commonwealth Aluminum Corporation, Bethesda, Md.

[21] Appl. No.: 576,836

[22] Filed: Feb. 3, 1984

[51] Int. Cl.$^4$ .............................................. C25C 3/06
[52] U.S. Cl. .................................. 156/242; 156/245; 204/67; 252/507; 264/29.1; 264/29.5
[58] Field of Search .................. 156/242, 245; 204/67; 252/507; 264/29.1, 29.5

[56] References Cited

U.S. PATENT DOCUMENTS

| | | | |
|---|---|---|---|
| 3,400,061 | 9/1968 | Lewis et al. | 204/67 |
| 3,429,759 | 2/1969 | Keller et al. | 156/155 |
| 3,441,529 | 4/1969 | Tyler | 260/19 |
| 3,492,208 | 1/1970 | Seager | 204/67 |
| 3,616,045 | 10/1971 | Kozar et al. | 156/326 |
| 3,657,592 | 4/1972 | Kellar | 313/357 |
| 3,661,736 | 5/1972 | Holliday | 204/67 |
| 4,093,524 | 6/1978 | Payne | 204/61 |
| 4,308,114 | 12/1981 | Das et al. | 204/67 |
| 4,308,115 | 12/1981 | Foster, Jr. et al. | 204/67 |
| 4,308,177 | 12/1981 | Tucker | 264/29.1 |
| 4,333,813 | 6/1982 | Kaplan et al. | 204/243 R |
| 4,349,427 | 9/1982 | Goodnow et al. | 204/243 |
| 4,376,029 | 3/1983 | Joo et al. | 204/294 |
| 4,439,382 | 3/1984 | Joo' et al. | 204/67 |
| 4,466,996 | 8/1984 | Boxall et al. | 204/67 |

OTHER PUBLICATIONS

Jarrett et al., "Advances in the Smelting of Aluminum", Metallurgical Treatises, presented at Beijing, China, Nov. 13-22, 1981, Metallurgical Soc. of AIME, Warrendale, PA, pp. 153-154.

Billehang and Oye, "Inert Cathodes for Aluminum Electrolysis in Hall-Heroult Cells (I and II)" *Aluminum* 56, (1980) pp. 642-648, 713-718.

Jarrett, "Hall-Heroult Process Developments", *Extractive Metallurgy* 1981, London, Sep. 21-23, 1981, Institution of Mining and Metallurgy, London, (1981), pp. 229-233.

Chaudry, "Reduction of Energy in Hall-Heroult Cells with Conventional and Special Electrodes", Aluminum Congress India Proc. Conf., India 1-3, Feb. 1982, National Alliance of Young Entrepreneurs, New Delhi, India, (1982) pp. 15-16, 18.

Beck, "New Directions in the Aluminum Industry", Electrochemistry in Industry, pp. 344-348.

Primary Examiner—Caleb Weston
Attorney, Agent, or Firm—Kenyon & Kenyon

[57] ABSTRACT

This invention relates to a method for the preparation of improved tiles or plates of enhanced density, freedom from defects, chemical and mechanical resistance, and increased longevity in service, for use as aluminum-wettable cathode surfaces for aluminum reduction cells. A mixture of Refractory Hard Material, carbonaceous filler, carbonaceous additive, and thermosetting binder system is subjected to vacuum during mixing so as to achieve a specified penetration depth as measured by ASTM standard C 360-63. The mixed composition is then molded, cured, and baked to form elements of the desired configuration.

30 Claims, 1 Drawing Figure

PROCESS FOR MANUFACTURE OF REFRACTORY HARD METAL CONTAINING PLATES FOR ALUMINUM CELL CATHODES

BACKGROUND OF THE INVENTION

This invention relates to cathodes for electrolytic cells for the production of aluminum, and specifically to the method for preparation of cathode plates or tiles of enhanced quality and increased service life for use in such cells. The cathode plate materials are subjected to vacuum mixing under conditions of low shear, cast, cured, and baked to form aluminum wettable Refractory Hard Material/carbon elements of higher density, strength, and durability than previously believed attainable.

Aluminum is conventionally manufactured by an electrolytic reduction process conducted in Hall-Heroult cells, wherein alumina is dissolved in molten cryolite and electrolyzed at temperatures of 900°–1000° C. These cells typically comprise a steel shell with an insulating lining of suitable refractory materials, which in turn is provided with a lining of carbon which contacts the molten bath, aluminum, and/or ledge. One or more anodes, usually made of carbon, are inserted into the molten cryolite and connected to the positive pole of a direct current source. The negative pole of the direct current source is connected to the carbon lining in the bottom of the cell. Molten aluminum resulting from the electrolytic reduction reaction is collected on the carbon bottom of the cell in a molten pool or pad, which acts as a liquid metal cathode onto which additional aluminum deposits. A portion of this pool of liquid is removed periodically and collected as the product of the electrolysis process.

In the construction of most modern commercial cells, the carbon lining that forms the top layer of the cathode is conventionally built from an array of prebaked carbon blocks covering the portion of the cell to be lined, and then the carbon blocks are joined into a solid continuous assembly by ramming the slots between blocks with a mixture typically of coke, calcined anthracite, modified coal tar pitch, and the like. This structure is then heated in the process of cell start-up. The life span of such carbon linings in different plants averages three to eight years, but under adverse conditions may be considerably shorter. Deterioration occurs due to penetration of molten electrolyte components and liquid aluminum into the structure of the carbon blocks, and ramming mix, causing swelling and cracking. Aluminum metal penetration causes alloying and slow destruction of the steel current collector bars embedded in the cell bottom. This contaminates the aluminum pad and may eventually lead to cell tap-out.

Other problems in conventional aluminum reduction cell operation include accumulation of undissolved or frozen bath and alumina which are carried from the cryolite bath, ledge, and ore cover, to the cathode, creating sludge or muck. The presence of this sludge or muck under the aluminum pad creates electrically insulated areas on the cell bottom which increase the cathode voltage loss and disrupt electrical current distribution, resulting in excessive pad turbulence and disturbances through magnetic forces, hence reducing cell current efficiency.

A further drawback of the carbon cathode lining is its non-wettability by molten aluminum, which necessitates operation with a deep pad of aluminum, to ensure effective molten aluminum contact to the carbon lining or surface. The deep aluminum pad is subject to magnetic and electrical interactions, such as standing waves, which increase the possibility of electrical shorting to the anode. To lessen this possibility, greater anode-to-cathode distances (ACD) are conventionally employed, resulting in additional voltage requirements.

To reduce ACD and associated voltage drop, it is necessary to make adjustments in magnetic design, or to operate without an aluminum pad. To achieve the latter goal, attempts have been made to use cathode materials comprising Refractory Hard Material (RHM), such as $TiB_2$. Titanium diboride is highly conductive and is wetted by liquid aluminum. This wettability property enables a thin film of molten aluminum to be deposited directly on the cathode structure made of RHM, and eliminates the need for a pad of metal, since contact with the underlying cathode structure is assured.

The use of titanium diboride current-conducting elements in electrolytic cells for the production of aluminum is described in the following exemplary U.S. Pat. Nos: 2,915,442, 3,028,324, 3,215,615, 3,314,876, 3,330,756, 3,156,639, 3,274,093, and 3,400,061. Despite the extensive effort expended in the past, as indicated by these and other patents, and the potential advantages of the use of titanium diboride as a current-conducting element, such compositions do not appear to have been commercially adopted on any significant scale by the aluminum industry. Lack of acceptance of $TiB_2$ or RHM current-conducting elements of the prior art is related to their lack of durability in service in electrolytic reduction cells. It has been reported that such current-conducting elements fail after relatively short periods in operation. Such failure has been associated with the penetration of the self-bonded RHM structure by the electrolyte, and/or aluminum, thereby causing critical weakening with consequent loss of cohesion, cracking, and failure. It is well known that liquid phases penetrating the grain boundaries of solids can have undesirable effects. For example, prior art RHM tiles, in which oxygen impurities were found to segregate along grain boundaries, are susceptible to rapid attack by aluminum metal and/or cryolite bath. Prior art techniques to combat $TiB_2$ tile disintegration in aluminum cells have included use of highly refined $TiB_2$ powder to make tiles containing less than 50 ppm oxygen. However, this high purity material costs 3 or 4 times as much as commercially pure $TiB_2$ powder (containing about 3000 ppm oxygen), and the necessary high temperature fabrication further increases the cost of $TiB_2$ tiles substantially. Despite the use of high purity materials, no cell utilizing $TiB_2$ tiles is known to have operated successfully for extended periods without loss of adhesion of the tiles to the cathode, or disintegration of the tiles. Other reasons proposed for failure of RHM tiles and coatings have been the solubility of the materials in molten aluminum or molten bath, the lack of mechanical strength, and the poor resistance to thermal shock.

Additionally, different types of $TiB_2$ materials, applied to carbon substrates, have failed due to differential thermal expansion between the titanium diboride material and the carbon cathode block. To the Inventor's knowledge no prior RHM-containing tiles or plates, even of high purity, have been successfully operated as a commercially employed cathode structure or surface layer, because of thermal expansion mismatch, bonding problems, etc.

For example, U.S. Pat. No. 3,400,061, of Lewis et al, assigned to Kaiser Aluminum, teaches a cell construction with a drained and wetted cathode, wherein the Refractory Hard Material cathode surface consists of a mixture of Refractory Hard Material, at least 5 percent carbon, of which 10 to 20 percent by weight is derived from pitch, baked at 900° C. or more. According to the patent, such a composite cathode has a higher degree of dimensional stability when electrolysed in a molten bath environment than previously attainable with carbon. The composite cathode coating material of this reference may be rammed into place in the cell bottom. Alternatively, shapes composed of the composite material may be produced in a separate facility for placement on a cathode block. Such material has not been widely adopted, however, due to susceptibility to attack by the electrolytic bath, as taught by a later Kaiser Aluminum U.S. Pat. No. 4,093,524 of Payne.

Said U.S. Pat. No. 4,093,524, of Payne, claims an improved method of bonding titanium diboride, and other Refractory Hard Materials, absent carbonaceous binders, to a conductive substrate such as graphite, or to silicon carbide. The cathode surface is made from titanium diboride tiles, 0.30 to 2.50 cm thick. Payne recognized that the large differences in thermal expansion coefficients between such Refractory Hard Material tiles and carbon precludes the formation of a bond which will be effective both at room temperature and at operating temperatures of the cell. The bonding is accordingly formed in-situ at the interface between the Refractory Hard Material tile and the cathode by a reaction between aluminum and the carbon beneath the tile to form aluminum carbide only when the cell approaches operating temperature. However, since the bond is not formed until high temperatures are reached, tiles are easily displaced during startup procedures. The bonding is accelerated by passing electrical current across the interface, resulting in a very thin aluminum carbide bond. However, electrolyte attack upon the bond results if the tiles are installed too far apart, or if the protective film of aluminum on the surface is incomplete. Alternatively, if the tiles are installed too close together, they bulge at operating temperature, resulting in rapid deterioration of the cell lining and in disturbance of cell operations. Further problems would probably be witnessed during fluctuations in cell temperature and during a shut-down and restart of a cell employing such bonding, because the thermal expansion mismatch has not been eliminated, merely circumvented at high temperature. Accordingly, this concept has not been extensively utilized.

Holliday, in U.S. Pat. No. 3,661,736, claims a dimensionally stable composite cathode for a drained and wetted cell, comprising particles or chunks of highly purified arc-melted "RHM alloy" embedded in an electrically conductive binder matrix, which may be carbonaceous. In this particular instance, the surface of the matrix becomes protected by an aluminum carbide layer. However, in operation of such a cell, electrolyte and/or aluminum attack the matrix material, large areas of which are exposed to contact, consequently leading to early destruction of the structure. Moreover, the relatively large chunks of $TiB_2$ suffer from the same drawbacks, in terms of poor thermal shock resistance, brittleness, etc., as wholly RHM materials.

U.S. Pat. No. 4,308,114, of Das et al, discloses a contoured cathode surface composed of Refractory Hard Material in a fully graphitic matrix. In this case, the Refractory Hard Material is composited with a pitch binder, and subjected to graphitization at about 2350° C., or above. Such cathodes are subject to early failure due to relatively rapid ablation, caused by physical erosion and aluminum carbide formation in the graphite matrix.

In addition to the above patents, a number of other references relate to the use of titanium diboride in tile form. Titanium diboride tiles of high purity and density have been tested, but they generally exhibit poor thermal shock and impact resistance and are difficult to bond to carbon substrates employed in conventional cells. Mechanisms of de-bonding are believed to involve high stresses generated by the thermal expansion mismatch between the titanium diboride and carbon, as well as aluminum penetration along the interface between the tiles and the adhesive holding the tiles in place, due to wetting of the bottom surface of the tile by molten aluminum. In addition to debonding, disintegration of even high purity tiles may occur due to aluminum penetration of grain boundaries. These problems, coupled with the high cost of the titanium diboride tiles, have discouraged extensive commercial use of titanium diboride elements in conventional electrolytic aluminum smelting cells, and limited their use in new cell design. To overcome the deficiencies of past attempts to utilize Refractory Hard Materials as a surface element for carbon cathode blocks, coating materials comprising Refractory Hard Materials in a carbonaceous matrix have been suggested.

In U.S. patent application Ser. Nos. 400,762 (pending), 400,772 (pending), and 400,773 (now U.S. Pat. No. 4,466,966), filed July 29, 1982 by Boxall et al, formulations, application methods, and cells employing $TiB_2$/carbon cathode coating materials were disclosed. This technology relates to spreading a mixture of Refractory Hard Material and carbon solids with thermosetting carbonaceous resin on the surface of a cathode block, followed by cure and bake cycles. Improved cell operations and energy savings result from the use of this cathode coating process in conventionally designed commercial aluminum reduction cells. Plant test data indicate that the energy savings attained and the coating life are sufficient to make this technology a commercially advantageous process.

Advantages of such composite coating formulations over hot pressed RHM tiles include much lower cost, less sensitivity to thermal shock, thermal expansion compatibility with the cathode block substrate, and less brittleness. In addition, oxide impurities are not a problem, and a good bond to the carbon cathode block may be formed which is uneffected by temperature fluctuations and cell shutdown and restart. Pilot plant and operating cell data indicate that a coating life of from four to six years or more may be anticipated, depending upon coating thickness.

However, problems inherent in this coating process include the fact that modifications in the coating formulation are required to compensate for changes in the mechanical properties and thermal expansion coefficients of different cathode blocks. The process is labor intensive and requires complex cure and bake heat treatments which can be very disruptive to plant operations. The need to maintain a good bond to the cathode block during the cure and bake heat treatments necessitates the use of less than optimum formulations and process conditions. Quality control is also difficult to maintain in the plant environment. Further, the variable electrical resistivity of the coating prior to baking can result in severe problems during cell start-up and finally, coating thickness is limited to approximately 1.2 cm.

Attempts have been made to retain the advantages of the novel composite coating material, as formulated and tested, while minimizing problems detailed above. For example, in U.S. patent application Ser. No. 461,893 (now U.S. Pat. No. 4,481,052), filed Jan. 28, 1983 by Buchta and Nagle, fabrication of hot pressed tiles is disclosed. However, the tiles prepared in accordance therewith, (utilizing thermosetting resin, Refractory Hard Material, and graphite, and formed under high pressure at elevated temperatures,) are mechanically soft, particularly after exposure to the aluminum cell environment, and are susceptible to aluminum carbide formation and consequent wear.

In contrast, the present invention retains the advantages of the novel composite coating material, without the drawbacks of the hot pressed tiles, by preparing structural shapes which are fabricated and heat treated prior to application to the cathode, rather than applying the material directly to the cathode substrate and then heating. Specifically, the added improvements include the fact that once baked, the plate material has a thermal expansion coefficient which is essentially equal to carbon; hence, only a simple carbon to carbon bond is required to attach the plate to the carbon cathode block. The production process can be readily automated at a central manufacturing plant. The baked plates can be glued to the cathode blocks either by the block manufacturer (or other vendor), or in the plant. Moreover, a central plate manufacturing plant affords the best equality control, since only a simple gluing operation is left for the less controlled smelter environment. Since there is no substrate-to-composite bond to maintain during the initial cure and bake heat treatments accompanying the material fabrication, the process can be optimized to produce the highest quality cathode plate material at a minimum cost. Once baked, the plate material is highly electrically conductive and therefore does not interfere with cell start up procedures. Multiple plates can be glued together to give any desired thickness. More efficient heat sources such as microwave can be used to cure the plate material, and complex shapes can be produced by this process to meet the needs of all foreseeable low energy cell designs.

In copending patent application Ser. No. 576,835 (abandoned, continued as Ser. No. 729,888), filed concurrently herewith, Boxall discloses molded aluminum wettable plates of Refractory Hard Material in a carbonaceous matrix bonded by amorphous carbon, derived from a thermosetting resin. Such a material is described in the aforementioned patent applications of Buchta et al, and Boxall et al. According to the invention described by Boxall, the composition is cast or pressed in a mold, then cured and baked to produce a rigid, electrically conductive element. The cathode plates may then be cemented to the aluminum smelting cell cathode substrate using conventional carbon cementing techniques. This method eliminates the need for compromising the coating composition in order, for example, to minimize differences in expansion behavior between block and coating during cure and heat-treatment prior to carbonization. After heat treatment and subsequent carbonization, the cast or pressed plates have a thermal expansion coefficient very close to that of carbon cathode blocks, so that maintaining attachment over wide temperature ranges is not a problem.

Boxall's disclosure demonstrates cathode plate elements and the ease of their attachment to cathode blocks or other similar carbon bodies. Electrical resistance measurements across the plate-to-substrate interface show that conventional start-up procedures will be fully viable for cells lined with the cathode plate material. It is well known that improvements in quality of carbon based cathode lining materials, such as increased density, reduced porosity, and freedom from flaws, result in improved performance in service, and increased service life. Porosity and flaws are known to increase susceptibility to thermal, chemical, and mechanical damage in the highly aggressive environment of an aluminum cell. The present invention reflects extensive development work undertaken to transfer Boxall's findings into a fully viable process for making such high quality plate material on a production basis.

SUMMARY OF THE INVENTION

The present invention deals with the development of an improved process to produce RHM/carbon preformed shapes and elements, such as plates and tiles of extremely high quality and enhanced performance and longevity. Said process is based on casting, curing, and baking the formulations previously described for use in the cathode coating process described above. Specifically, this invention relates to the use of vacuum mixing, under conditions of low shear, for the purpose of degassing and reducing the liquid content of the green mix.

In the present invention, vacuum mixing is performed for substantial periods (i.e. 5 to 30 minutes, depending on batch size) in order to lower the liquid content of the mix. In the prior art, vacuum mixing has been conducted only for the purpose of degassing (deaerating) wet mixes, which required the application of vacuum for only about 30 seconds. The dramatic benefits currently seen with vacuum mixed batches cannot be achieved with prior art techniques.

The method set forth by the present invention is not only more reliable and consistent, but surprisingly enables one to decrease liquid content of the casting composition prior to casting, while achieving increased density and quality in the cast, cured, and baked elements.

DETAILED DESCRIPTION OF THE INVENTION

Figure 1:
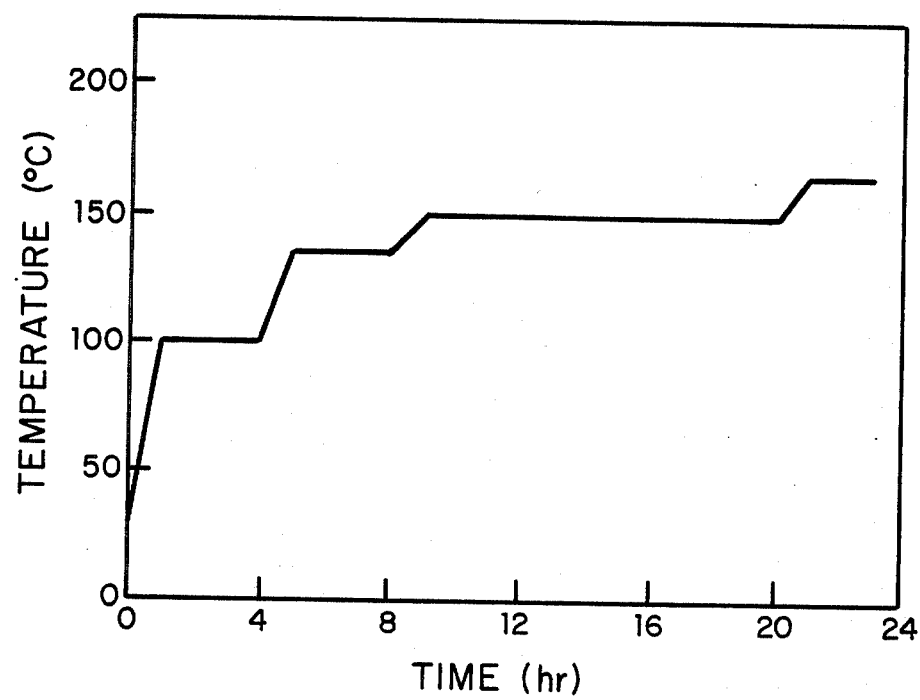
FIG. 1 represents a typical time-temperature relationship suitable for a cure cycle utilized in the preparation of titanium diboride/carbon plates in accordance with this invention.

It has been found that plates, shapes, or tiles may be fabricated using Refractory Hard Material (RHM) combined with specified thermosetting bonding agents and other materials to form structures that improve the operation of conventional aluminum reduction cells. Such improvements over conventional carbon cathode cells include cathode wettability by molten aluminum, low solubility in the molten aluminum and cryolite environment, good electrical conductivity, and decreased muck adhesion.

In accordance with the teachings of Boxall, Ser. No. 576,835 (abandoned, continued as Ser. No. 729,888), it is apparent that direct application coating materials can be preformed successfully in molds without major adjustment to formulations and mixing parameters. The clear and immediate advantage to this process is the most of the processing technology may be removed from the aluminum plant environment and transferred to a separate processing facility. The typical aluminum plant environment is not conductive to setting up activities outside the main stream of cell operation and maintenance. Greater quality control, convenience, and ease of equipment and support operations can be achieved at higher levels in a facility dedicated to production of RHM containing cathode elements, such as made possible through the teachings of Boxall.

The improvements achieved by Boxall, however, did not include improvements in quality, longevity, or performance of the materials utilized beyond those inherent in spread coating materials. The present novel invention has now opened the way to many further improvements in the finished product, and in processing techniques. Three different areas of such improvement have been achieved by the present invention, which are summarized briefly now, and fully illustrated by the examples which follow.

1. Improvements in Monolith Quality: Deaeration of the wet coating mix produces reduced porosity in the final products. This feature is particularly important in aluminum smelting cell applications, as the penetration of molten aluminum and bath, with accompanying disruptive reactions, will be impeded by diminished porosity. However, the dramatic increases in density, freedom from flaws such as lateral striations, and improvements in surface quality after cure achievable in the present invention are only possible as a result of vacuum mixing long enough to lower the liquid content of the mix. The density now possible for elements prepared in accordance with this invention can only be compared with density of elements previously obtained through hot-pressing (see, for example, patent application Ser. No. 461,893 (now U.S. Pat. No. 4,481,052), Buchta et al). The increased density upon cure is witnessed, for example, by a reduction in size of the molded shape by approximately 10–15 percent in thickness and approximately 1–2 percent in lateral dimensions, in a typical molded plate.

2. Increase in Material Thickness: Boxall, in Ser. No. 576,835 (abandoned, continued as Ser. No. 729,888), demonstrates that relatively thick sections of coating material can be formed through centrifuging a normal cathode coating formulation and decanting off the liquid that separates. However, some cracking of the sample was seen after cure. The present technique of applying vacuum for a fixed time period, after premixing, allows for simpler processing and easier control of liquid loss. Moreover, the detrimental cracking observed by Boxall has been entirely eliminated by the present invention by use of a novel approach together with an exacting choice of processing parameters and methodology. Thick sections, up to about 1.90 cm, have now been prepared, cured and baked with quality comparable to structure only half as thick. The combination of improved quality and increased thickness is a large and most important step in optimizing the cathode material for increased durability and longevity in the aluminum cell environment.

3. Transfer of the Technology of Plate Manufacture from the Laboratory to Multi-Unit Production: In order to exploit the benefits of premanufacture of plate structures, particularly high quality vacuum mixed plates, apparatus and procedures have now been established that allow for easy repetitive processing of uniformly high quality elements. Monolith quality is ensured through vacuum mixing. A cured product, free from warping, is obtained by weighting the wet surface of the cast mix while mold warping is prevented by using relatively thick gauge steel. Mold-release is achieved with thoroughly cleaned molds coated with a PTFE based paint, and release of the steel weighting plate is accomplished by coating it with the same paint or with sheet PTFE glued to the lowermost weight. Vacuum equipment is protected from particulate and liquid contamination by installing a cold trap and particulate filter before the vacuum pump.

In accordance with the present invention, highly uniform homogeneity and blending is achieved, under conditions of low shear, in a double planetary mixer (Ross LDM 2, or similar mixing equipment). An unanticipated benefit has been found, in that application of vacuum under such mixing conditions permits large fresh areas of green mix to be exposed continually to vacuum, hence yielding excellent deaeration and liquid removal.

Further, an improved technique has been developed for thoroughly premixing the composition while providing gentle preheat, followed by the application of vacuum for a predetermined time concurrent with further mixing. This method is particularly advantageous, since heretofore unattainable benefits result from starting the mixing process with a relatively high liquid content (typical of compositions used for directly coating cathode blocks). This allows for relatively easy, thorough and uniform homogenizing, and the dry components become thoroughly wetted and stick together so that essentially no solids are drawn over subsequently into the vacuum system. It is then possible to reduce the pressure in the mixing chamber, and slowly draw off that liquid from the mix which is in excess of the minimum required to just wet and bond the solid particles. The minimum liquid content in the green mix previously has been dictated largely by limitations on the mixing hardware to ensure complete wetting and uniform dispersion of the ingredients in a relatively fluid mixture. The present method obviates this difficulty by premixing and preheating with adequate liquid for these purposes, and only removing the excess once wetting is complete. The capillary action between adjacent wetted particles prevents loss of "useful" bonding liquid on the surface of particles and in between them, during the early stages of applying vacuum. "Free liquid" however, readily passes over into the vacuum system. It is believed that excess free liquid is responsible for large scale coating defects witnessed after curing and baking the monolith in previous plate manufacture techniques. In prior art cathode coating methods, excess free liquid was desirable and/or required to permit penetration and adherence to the surface of the carbon block substrate.

In the manufacture of plate material, it is particularly important that liquid levels be minimized to the greatest extent possible, because the external pathways for gas release are severely restricted when the material is contained in steel molds under steel weights. The limit that has previously been applied (in terms of dryness) relates not only to satisfactory mixing, but also to spreadability, since the dryest mixes tend to retain their shape too readily, and are therefore difficult to force into the corners of a mold, and will tear rather than flow plastically. It is also critical to retain enough liquid for adequate self-bonding within the final product. The best compromise between these criteria, for maximizing dryness while retaining sufficient liquid, has now been established empirically. It has unexpectedly been found that molding compositions may be gauged for suitability in the present invention by use of a measured ASTM penetration depth value (as will be discussed hereinafter).

The common understanding of those of ordinary skill in the art is that the behavior and results achievable with a resin-bound mass are dictated primarily by the absolute liquid and resin content of said mass. Heretofore, trial and error, combined with undefined operator experience and capability, have been determinative in evaluating the suitability of resin mixes. It has now been found that penetration depth, as a measure of viscosity, is the appropriate qualifying factor or parameter, since it takes into account both controlling factors, i.e. temperature and resin content.

Thus, a molding composition subjected to a reduction in liquid content adequate to result in a penetration depth being within a specified range (as defined hereinafter) will qualify as acceptable for the presently required standard of product quality. Results have confirmed excellent curing properties, excellent structural properties and density, and the mix remains spreadable with some vibration assistance. While such an approach may have some benefits (at appropriate viscosity levels) for directly applied coatings, the poor spreading characteristics and low binder liquid levels resulting from extended vacuum mixing cannot be tolerated.

The present work has resulted in the preparation of thicker monolith sections than had ever been fabricated heretofore. Even with reference to the plates proposed by Boxall in Ser. No. 576,835 (abandoned, continued as Ser. No. 729,888), the present modifications have the unobvious and unexpected benefit of allowing much thicker plate material to be produced. Hitherto cathode coating and cathode plate materials had been limited in thickness to between 0.9 cm and 1.3 cm, due to gas evolution problems in thicker sections. As will be described by specific example, plates 1.9 cm thick can now be manufactured, and greater mold depths than this are considered feasible.

In summary then, the present disclosure embodies all of the advantages cited for plate materials, as opposed to coatings, while teaching a process which results in previously unattainable improvements in product quality, greater thickness, and ready adaptation to the processing of large numbers of plates on a production basis.

In understanding the concept of the present invention, it is important that certain distinctions and definitions be observed. Accordingly, the following definitions shall be applied with respect to this invention.

The terms "molding" or "casting" are intended to encompass shaping a mass of material generally within a space or cavity. Extrusion and injection molding are within the scope of these terms, while hot pressing is excluded. Whereas compositions utilized for molding or casting incorporate at least a sufficient quantity of mix liquid to assure complete and intimate wetting of the surfaces of the particulate solids, and to assist in blending, hot pressing compositions do not.

The "molding composition" of the present invention is comprised of Refractory Hard Material, carbonaceous additive, carbonaceous filler, and binder system. As used herein, the terms "molding composition", "molding material", "casting composition", and "casting material" shall be used synonomously to encompass the combination of these materials.

The "Refractory Hard Materials" are herein defined as the borides, carbides, silicides, and nitrides of the transition metals in the forth to sixth group of the periodic system, often referred to as Refractory Hard Metals, and mixtures and alloys thereof.

"Resinous binder" shall be used to designate a polymerizable and/or cross-linkable thermosetting carbonaceous substance.

The "mix liquid" of the present invention functions in a variety of manners in the molding composition of the present invention, depending upon specific composition. It may be present to allow easy and uniform mixing of the solid components of the composition and to provide an easily moldable mass. Certain mix liquids, such as furfural, may also permit an increase in the amount of carbonaceous filler which may be incorporated in the composition. The mix liquid also permits wicking of the resin into interstitial voids between particles of the molding composition by capillary action. The mix liquid may act solely as a solvent for the resinous binder (which may already be present as a solid), such as methyl ethyl ketone (which could dissolve a solid novolac resin), and be evaporated during cure and carbonization operations. If, on the other hand, the mix liquid is present simply as an inert carrier liquid, then it too may be evaporated during cure and carbonization. Otherwise, the mix liquid may function as a combined solvent and resin in its own right, such as a mixture of furfuryl alcohol and furfural, part of which volatilizes during heating while the remainder becomes incorporated into the resinous binder. In another instance, the mix liquid may be the resinous binder per se, such as where the resinous binder is a liquid such as furfural (generally in combination with phenol or furfuryl/alcohol), furfuryl alcohol, or low polymers of these, or a resole. The mix liquid may also comprise the resinous binder in the case of a solid resin, such as a novolac, dissolved in a solvent (the solvent portion of which may volatilize during heat up), or a high viscosity resin such as a partially polymerized resole thinned by a solvent. The mix liquid may also contain gas release agents, modifying agents, and curing agents.

"Binder system" shall be used to indicate the resinous binder and the mix liquid, and, if required, gas release agents, modifying agents, and curing agents.

"Gas release agent" shall be taken to mean agents present which form liquid phases which seep through the molding composition and then evaporate, to create small channels to permit release of volatiles.

"Modifying agents" shall be taken to mean materials added to the resinous binder to modify, for example, curing, electrical properties, or physical properties such as flexural strength or impact strength prior to carbonization.

"Curing agents" shall be taken to mean agents required to either copolymerize with the resin or to activate the resin to a state in which the resin may polymerize or copolymerize. Cross-linking or activating agents fall into this category, as do catalysts required for most polymerization and cross-linking reactions.

"Carbonaceous filler" shall be interpreted to mean those carbonaceous materials present, either as a component of a known carbon cement or as part of a proprietary or custom carbon system, having a C:H molar ratio greater than 2:1, which are smaller than 100 mesh in size. While a carbonaceous filler may have reaction groups present, and need not be fully carbonized, such materials do not typically polymerize with themselves as the resinous binder material does. Further, carbonaceous filler is essentially insoluble in commonly used solvents such as methyl ethyl ketone or quinoline, while the resinous binder (in its incompletely cured state) is usually soluble therein.

"Carbonaceous additives" shall indicate those carbonaceous materials present, either as a component of a known carbon cement or as part of a proprietary or custom carbon system, having a C:H molar ratio greater than 2:1, which comprise particulate carbon aggregate having a particle size range between −4 mesh and +100 mesh, and/or carbon fibers.

The term "carbon system" shall encompass the binder system plus carbonaceous additive and carbonaceous filler.

"Carbon matrix" shall refer to the carbonized product of the carbon system, and is thus bonded by amorphous carbon formed by the carbonization of the binder system.

"Carbon cement" shall be taken to mean a commercially available carbonaceous cement or adhesive, generally comprising a resinous binder, mix liquid, carbonaceous filler, and curing agents, the solid and liquid portions of which may be packaged separately to increase shelf life, or combine as a premixed cement. Gas release agents, and/or modifying agents may be present in such systems, or may be added thereto for use in the present invention. Carbonaceous additives are generally added to such systems for use in the present invention, as they are generally not present in commercially available formulations.

Pitch may be present as part of the resinous binder, as a modifying material, but requires the presence of a suitable curing agent, such as hexamethylenetetramine. Such a curing agent may be already present as a component of the resinous binder, or may be added thereto to facilitate cross-linkage between the resinous binder and the pitch, or linkage between the pitch and carbonaceous filler, or self-linkage between the polynuclear aromatics which comprise the bulk of pitch. Although pitch is known to constitute a graphite precursor, graphitization is not desired in the present invention. Thus, the graphite precursor is dispersed within the resinous binder, which is an amorphous carbon precursor. This effectively cross links the binder phase, which prevents layer plane alignment in the graphite precursor, preventing graphitization, and at the same time producing three dimensional strength. Pitch may seep through the molding composition to provide gas release channels, and may, in the presence of appropriate curing agents, cross link with the resinous binder and/or the carbonaceous filler.

It is desirable that the amount of shrinkage that the cured binder system undergoes during carbonization be as small as possible. This may be accomplished by selection of a carbonaceous resin which when utilized in accordance with the present invention and subjected to carbonization exhibits a shrinkage less than that which would induce formation of large cracks or voids. Fine vertical cracking within the carbonized plate is preferred to horizontal cracking as a stress relief mechanism. However, a plate which has essentially no cracks is preferred. The presence of carbonaceous additive and/or filler is beneficial in this regard.

It has been found critical to utilize a binder system which, when subjected to carbonization, has a char yield of greater than about 25 percent. "Char yield" is defined herein as the mass of stable carbonaceous residue formed by the thermal decomposition of unit mass of the binder system, within a formulated carbon system, in an inert atmosphere. Thermogravimetric analyses of various binder systems have demonstrated that the amount of char yield is a function of the aromaticity of the resin structure. In general, carbon rings that are bonded at two or more sites will usually remain as char. Ladder polymers are the most stable, losing only hydrogen, and giving a very high carbon char yield.

"Char yield" of a binder system, as utilized herein, is determined by curing a proposed carbon system (i.e. binder system plus carbonaceous additive and filler) for a 24 hour period so as to achieve polymerization and/or cross-linkage, followed by heating at 250° C. for sufficient time to achieve constant weight, in order to ensure full cure and to eliminate volatiles, polymerization products, and/or unreacted liquid. THe sample is then baked to 1000° C. in a non-oxidizing atmosphere, and the remaining char weight determined. Similarly, the char weight of carbonaceous additive and filler present in the carbon system is determined, and subtracted from the char weight of the carbon system to determine the char weight of the binder system alone. From the weight of the carbon system at 250° C., and the known weight of carbonaceous additive and filler at 250° C., one may calculate the weight of the binder system at 250° C. The char yield of the binder system is then calculated, as a percentage, from the char weight of the binder system after baking to 1000° C. and the weight of the binder system at 250° C. It has been observed that binder systems exhibiting a char yield of greater than about 25 percent give acceptable cathode materials upon cure and carbonization, while a binder system exhibiting 8 percent char yield gave an unacceptable carbon matrix upon carbonization. Char yields in excess of about 50 percent are preferred.

To achieve a long-lasting plate or tile in the environment of an aluminum cell, it is desired that the effective rate of ablation of the cured and carbonized carbon system within the composite be close to the combined rate of wear and dissolution of the Refractory Hard Material in such environment. As the Refractory Hard Material is removed from the plate or tile by exposure to the aluminum cell environment, the carbon matrix thereof is removed at a similar or very slightly faster rate, thus exposing additional Refractory Hard Material to the cell environment. In this manner, the cathode surface remains essentially constant, in terms of both carbon and Refractory Hard Material content, thus improving cell operation as measured by uniformity of performance. In previous attempts to provide cathodes containing Refractory Hard Material, ablation and/or intergranular attack have resulted in rapid surface deterioration due to depletion of either the Refractory Hard Material or the binding matrix at a rate greater than the other, resulting in periods where there are localized areas having either a Refractory Hard Material-rich surface composition with insufficient binding capability, or a carbon-rich surface with insufficient Refractory Hard Material. The present invention overcomes these failures by providing an element in which Refractory Hard Material and carbon matrix are dissolved or otherwise depleted at approximately equal rates.

It is important to clarify or distinguish between carbonizing and graphitizing as they apply to heating carbonaceous bodies in the context of the present invention. "Carbonizing" is normally done by heating a carbonaceous body, either in unitary or particulate form, for the purpose of driving off volatiles, and progressively increasing the ratio of carbon to hydrogen, by progressively eliminating hydrogen from the body. In the carbonizing process, the temperature is gradually increased to allow for the slow evolution of volatiles such as decomposition products so as to avoid blister formation, and to permit volumetric shrinkage (which will occur at some point in the operation) to proceed gradually, so as to avoid formation of large cracks. While curing is considered to take place at temperatures up to about 250° C., carbonization temperatures normally range from about 250° C. to about 1000° C., although higher temperatures up to about 1450° C. can also be employed. While carbonization may be continued to about 1000° C., or higher, the carbonization of the carbonaceous materials present in the instant invention is essentially complete at about 800° C., and the resinous binder has been carbonized to bind the carbonaceous filler and carbonaceous additive materials and RHM into a durable structure.

Graphitizing, on the other hand, requires considerably higher temperature and longer time periods, and produces drastic and easily detectable changes in atomic and layer plane arrangement. In graphitizing, the temperatures employed range from slightly over 2000° C. up to 3000° C., with typical temperatures ranging from about 2400° C. to about 3000° C. These temperatures are usually associated with the higher quality grades of graphite. This heating is typically for a period of about two weeks, in a non-oxidizing atmosphere. Such heating is normally done by passing an electrical current directly through the carbon so as to heat it directly by its own electrical resistance, as opposed to the indirect furnace heating means conventionally employed for carbonization. In general, graphitizing is only practicable with well known graphite precursor materials of high aromaticity and negligible cross-linking, such as pitch. Cf., R. E. Franklin, Proceedings of the Royal Society of London, Vol. A 209, p. 196 (1951).

One acceptable practice in producing carbonaceous plates according to the present invention is to employ particulate graphite as a filler material which is added to the binder and other components. The mixture is then formed, cured, and carbonized. While this carbonized carbonaceous material may thus contain some particulate graphite, it is not bonded by the graphite, but rather contains both graphite particles from the filler and/or additive, and amorphous carbon derived from the binder and/or components of the carbonaceous filler and additive. In practicing the present invention it is important that the carbonized cathode plate be constituted of a non-graphitizing binder so as to assure the proper combination of electrical and thermal conductivity, ablation rate, and stability properties in the carbon-Refractory Hard Metal surface.

While the borides, carbides, silicides and nitrides of elements in Groups IV to VI of the Periodic Table generally all possess high melting points and hardness, good electrical and thermal conductivity, are wetted by molten aluminum, and are resistant to aluminum and alumina-cryolite melts, $TiB_2$ is the preferred RHM due to its relatively low cost, ready availability, and high resistance to oxy-fluoride melts and molten aluminum. Suitably, Refractory Hard Material particle sizes may range from submicron to about 10 mesh, preferably about −100 mesh, and most preferably about −325 mesh.

The $TiB_2$ preferred for use in this invention is typically specified as −325 mesh, although −100 mesh may be utilized. If the $TiB_2$ is made by carbothermic reduction of titanium and boron oxides and carbides, individual particles will normally fit the requisite category of single crystals. This also holds true for $TiB_2$ made by plasma methods described in U.S. Pat. No. 4,282,195 to Hoekje of PPG Industries. The $TiB_2$ particles should preferably be single crystals, cracked single crystals, or have minimal grain boundaries such that all $TiB_2$ crystals are in contact with the binder.

Other RHM materials may be successfully substituted for $TiB_2$, when appropriate changes in the composition are made to account for differences in wettability, surface area, particle size, porosity, and solubility of the RHM. Sufficient RHM is incorporated in the molding composition to ensure aluminum wetting, while thermal expansion mismatch effects are minimized and a dissolution rate of Refractory Hard Material less than the rate of loss of the carbon matrix of the coating is achieved. While discussion of the invention will focus on the use of $TiB_2$ as the preferred RHM, it is contemplated that any suitable RHM, such as $ZrB_2$, and mixtures or alloys of Refractory Hard Materials, may be utilized. In general, the RHM may comprise from about 20 to about 90 percent by weight of the composition, and preferably from about 25 to about 80 percent. It has been found that aluminum wettability may be achieved at concentrations as low as about 10 percent, but better results are achieved from 20 percent upward, with from about 35 to about 70 percent being the most preferred range.

The resinous binders of the present invention may comprise any which meet the aforementioned criteria. Typical resins which can be employed include phenolic, furane, polyphenylene, heterocyclic resins, epoxy, silicone, alkyd, polyimide resins and mixtures or copolymers thereof. Examples of phenolic resins which can be employed include phenol formaldehyde, phenol acetaldehyde, phenol-furfural, m-cresolformaldehyde and resorcinolformaldehyde resins. Epoxy resins which can be utilized include the diglycidyl ether of bisphenol A, diglycidyl ether of tetrachlorobisphenol A, diglycidyl ether of resorcinol, and the like, and especially the epoxy novolacs. Preferred epoxies comprise the glycidyl ethers such as the glycidyl ethers of the phenols, and particularly those prepared by reacting a dihydric phenol with epichlorhydrin, e.g., the diglycidyl ether of bisphenol A, and epoxy novolacs. The silicone polymers which can be employed include methyl siloxane polymers and mixed methyl phenyl siloxane polymers, e.g., polymers of dimethyl siloxane, polymers of phenylmethylsiloxane, copolymers of phenylmethylsiloxane and dimethylsiloxane, and copolymers of diphenylsiloxane and dimethylsiloxane. Examples of heterocyclic resins are polybenzimidazoles, polyquinoxalines and pyrrones. Any of the well known specific alkyds, particularly those modified with phenol formaldehyde, and polyimide resins can be employed. The phenolics and furanes are the preferred classes of resins, particularly in view of relatively low costs. Furane resins are very advantageously employed as the resinous binder.

In addition to those set forth as components of the commercially available carbon cements, such as UCAR C-34, (a trademark of Union Carbide) discussed hereinafter, a wide variety of novolac resins may be used as the basic resinous binder in the present invention. The term novolac refers to a condensation product of a phenolic compound with an aldehyde, the condensation being carried out in the presence of an acid catalyst and generally with a molar excess of phenolic compound to form a novolac resin wherein there are virtually no methylol groups such as are present in resoles, and wherein the molecules of the phenolic compounds are linked together by a methylene group. The phenolic compound may be phenol, or phenol wherein one or more hydrogens are replaced by any of various substituents attached to the benzene ring, a few examples of which are the cresoles, phenyl phenols, 3,5-dialkylphenols, chlorophenols, resorcinol, hydroquinone, xylenols, and the like. The phenolic compound may instead be naphthyl or hydroxyphenanthrene or another hydroxyl derivative of a compound having a condensed ring system. It should be noted that the novolac resins are not heat curable per se. Novolac resins are cured in the presence of curing agents such as formaldehyde with a base catalyst, hexamethylenetetramine, paraformaldehyde with a base catalyst, ethylenediamineformaldehyde, and the like.

For purposes of the present invention, any fusible novolac which is capable of further polymerization with a suitable aldehyde may be employed. Stated another way, the novolac molecules should have two or more available sites for further polymerization and/or cross-linkage. Apart from this limitation, any novolac might be employed, including modified novolacs, i.e., those in which a non-phenolic compound is also included in the molecule, such as the diphenyl oxide or bisphenol-A modified phenol formaldehyde novolac. Mixtures of novolacs may be employed or novolacs containing more than one species of phenolic compounds may be employed.

Furfuryl alcohol may be advantageously employed as the mix liquid with a phenolic carbonaceous binder, and is believed to react with the phenolic resin as it cures, serving as a modifying agent for the resin. The use of furfuryl alcohol is preferred as it has been found that bonds having the high strength obtainable through the use of this mix liquid cannot be produced when other mix liquids are substituted for furfuryl alcohol. Thus, for example, when furfuraldehyde is employed in place of furfuryl alcohol in otherwise identical compositions, bonds are produced having only about half the strength of the bonds produced using the furfuryl alcohol.

Since the net final effect desired is to achieve a plate composed essentially of RHM and carbon, the binder system should be readily decomposable, in high yield, to a carbon residue. The resinous binder should comprise from about 1 to about 40 percent of the composition, whether as a part of a carbon cement or as a custom carbon system. Although higher resin concentrations are possible, little advantage is attained, and extended cure and carbonization cycles may be required. The carbon system should comprise about 10 to about 80 percent of the molding composition, preferably from about 20 to about 75 percent, and most preferably from about 30 percent to about 65 percent of the molding composition.

One may utilize appropriate blends of carbon and phenolic resin or other thermosetting resinous binders, or alternative commercial compositions. The mix liquid component of the molding composition may vary from approximately 0 weight percent to about 40 weight percent for reasonable evaporation and curing rates, with about 10 percent to about 20 percent being preferred to obtain workable consistency. Insufficient liquid will make the mix dry and difficult to mold, while excessive liquid results in difficulties in curing and baking.

Various modifying agents may be present to modify the nature of the resinous binder during mixing, curing, and carbonization of the molding composition. These may typically constitute from zero to about 10 percent by weight of the molding composition. Suitable modifying agents for phenol formaldehyde resins, for example, include pitch, rosin, aniline, copolymers, resin "alloys", etc.

Some particulate carbon, either amorphous or graphitic, is frequently present in the commercially available cements mentioned heretofore. Further particulate carbon may be added, as either fine powder or coarse aggregate, or mixtures thereof, in the form of amorphous carbon or graphite carbon.

It is particularly highly desirable to have a carbonaceous filler material present, either as a component of a proprietary carbon system or present in a commercial cement, or as an addition to a commercial cement. Such carbonaceous filler is $-100$ mesh, and preferably $-325$ mesh, and may comprise fine carbonaceous flour, graphite flour, crushed coke, crushed graphite, carbon black, and the like. The presence of such fine flours yield improved packing density for the granulometry used, that wicks up resins and other liquid phases to develop a dense, highly bonded carbon matrix upon carbonization.

Carbonaceous filler, as fine flour, should comprise from about 1 percent to about 60 percent of the molding composition, with about 10 percent to about 40 percent being preferred. The carbonaceous additive, or aggregate material, if present, may run from $-4$ mesh to $+100$ mesh, and is preferably between $-8$ mesh and $+20$ mesh. Such coarse aggregate apparently permits micro-cracking, assists volatile emission release, reduces shrinkage, and contributes to high carbon yield. Carbonaceous additive, as aggregate and/or fiber, should comprise from about 0 percent to about 30 percent of the molding composition, with from about 5 percent to about 15 percent being preferred.

As previously set forth, it is preferred that carbon fiber be added to the molding composition for the purpose of arresting cracks during the primary heat treatment and processing. When such fiber is used, some variations in composition ranges have been found. When carbon fibers are used, they may preferably be made from pitch precursors, organic fibers precursers such as polyacrylonitrile, or rayon. Pitch fibers are considerably cheaper, and accordingly preferred. Fiber weight may range from zero percent to about 30 percent by weight of the composition, preferably from about 0.05 to about 1.0 percent, and more preferably from 0.10 to about 0.5 percent. However, concentrations greater than about 10 percent become comparatively expensive, with little apparent added benefit. Carbon fibers with lengths varying from about 0.15 cm to 1.25 cm length are preferred. Short fibers permit easier mixing, and may be used in higher concentration. Sized fibers, consisting of parallel fiber strands bonded together by a material soluble in the mix liquid, are particularly preferred, since they blend most easily with the binder system. Fiber orientation may vary, and the fibers can be mixed as an integral part of the composition.

Gas release agents are appropriately included in the molding composition to avoid blisters and/or excessively large cracks. Suitable gas release agents include high boiling point liquids such as combustible oils, soaps, and waxes.

A preferred binder system is that which is commercially designated as UCAR C-34, produced by Union Carbide. This composition is believed to comprise a mixture of an oil, a soap, finely-divided carbonaceous particles, furfuryl alcohol, a phenolic resin of the novolac type, and a hardening agent for the phenolic resin. Small amounts of pitch may be present in some lots of UCAR C-34 material. The mixture of the oil, finely-divided carbonaceous particles, phenolic resin, and pheonlic resin hardener can be prepared by blending the carbonaceous particles, phenolic resin and phenolic resin hardener together in any conventional manner, e.g. in a tumbling barrel, spraying the oil into the resulting mixture, and further blending the mixture until the oil has been incorporated therein and a substantially homogeneous blend formed. The mixture of soap and furfuryl alcohol can be prepared by heating the soap up to a temperature of about 50°–100° C. to liquify it, and then dissolving the molten soap in the furfuryl alcohol. Upon cooling, the soap remains dissolved in the furfuryl alcohol as a stable solution which can be stored until it is ready to be mixed with the mixture of oil, finely divided carbonaceous particles, phenolic resin, and phenolic resin hardener. The two mixtures, one liquid and the other essentially solid, can be readily mixed at room temperature, either manually or mechanically.

The TiB$_2$/carbon formulation can be molded into the desired shape or plate by many different approaches. The types of mold used may vary from a simple metal, plastic or other rigid mold to a disposable mold or mold liner made of paper, styrofoam or similar material. For automation purposes, the mold may be more complex, similar to those used for injection molding in the plastics industry. A mold release such as FREKOTE or a mold liner may be used to assist in the release of the cast shape from the mold.

The TiB$_2$/carbon formulation may be mixed conventionally, but preferably under vacuum. Mixing times in both cases may range from 5–60 minutes with 5–30 minutes preferred. When mixing is performed under vacuum it is preferable to premix and prewarm the green paste for a period of 5–30 minutes before reducing the pressure in the mixing chamber. This period allows for uniform homogeneous blending and temperature equilibration in the mix, and ensures that all solid particles are fully wetted. Vacuum is then applied for a further 5–30 minutes while continuing to blend as before. The time during both stages of mixing will, of course, depend on the design of mixer and size of batch. Premixing and prewarming is preferably carried out for between 7 and 20 minutes, and vacuum mixing should be applied for between 5 and 15 minutes, when using a Ross LDM-2 double planetary mixer. Reducing the pressure for shorter times than this results in little liquid loss, and the benefits of vacuum mixing are not seen in final plate quality. Applying vacuum for excessive periods causes the mix to become dry and unworkable, to the extent that the mix can even pelletize into small dry balls in the mixer. It is preferred that the liquid content of the composition be reduced by from about 5 percent to about 15 percent, based on mix liquid weight, and preferably by from about 7 percent to about 10 percent. Thus, the liquid content of the molding composition is reduced from a preferred level (for mixing or working purposes) of about 15 percent of the total composition to a reduced level of about 13 to 14 percent of total composition weight, without loss of integrity in the cured and baked products. While the difference in liquid content appears minimal when expressed in percentages, unexpected and highly significant differences in viscosity result. These viscosity differences may be measured, as set forth hereinafter, and employed as a control factor in vacuum blending operations. During the prewarming, premixing stage, the lower time limit is set by the time needed to achieve uniform temperature throughout the mass of mixed material, and the upper limit is dictated only by avoidance of premature cure of the binder in the mixes.

Prewarming is particularly important when utilizing vacuum mixed formulations, since they are typically relatively stiff and unworkable, and mild heat reduces the viscosity of the binder so that spreading is still possible. For the same reason, the mold should be prewarmed to avoid cooling and thickening the mix as it is supplied. If these two steps are omitted, the final product will typically show "mold-filling related" defects such as vertical cracks and scaling, where the green mix was pulled apart during spreading.

Since the viscosity of a molding composition is directly related to the liquid content, temperature, and mixing method it is also a reliable indicator of the resultant plate quality. An ASTM Procedure, explained in Example 11, was used to quantify the viscosity values of several types of molding compositions described in other examples. The values are expressed in terms of penetration depths, where higher values imply lower viscosities. The results may be summarized as follows.

Compositions which have been conventionally mixed at room temperature have typical penetration depths within the range of about 50 to about 55 mm as measured according to ASTM method C360-63. When these mixes are cast and cured, the resultant cured castings exhibit a certain degree of porosity and lateral striations throughout the plate. In addition, a casting composition of this type is difficult to spread at room temperature and defects related to mold-filling such as small, vertical and "fish-scale" cracks result upon curing. These defects are caused by tearing and folding the viscous mixture during molding.

Improvements are witnessed when a conventionally mixed casting composition is warmed during mixing and cast in a warmed mold. This increases the penetration depth of the mixture to the range of about 55 to about 60 mm and eliminates any mold-filling related defects. On the other hand, curing defects such as porosity and horizontal cracking will remain.

The amount of porosity and horizontal cracking can be reduced by vacuum mixing for less than the optimum time which typically decreases the liquid content to about 14–15% of the total (conventionally mixed) composition. However, this decreases the penetration depth to the range of about 50 to about 55 mm and results in the aforementioned mold-filling related defects.

The curing defects are completely prevented through the use of a closely specified adequate amount of vacuum mixing. Vacuum mixing lowers the final liquid content and increases the density of both the casting composition and resulting cured plates. When vacuum mixing is utilized at room temperature, liquid is removed, and the resulting composition is stiff, sticky and hard to spread. The penetration depth ranges from about 25 to about 36 mm and mold-filling related surface defects such as those described earlier are apparent after curing. However, the internal porosity and striations have been eliminated.

As before, the mold-filling related defects may be eliminated by vacuum mixing at an elevated temperature (30° to 50° C.) and casting in a warm mold. This increases the penetration depth to a preferred range of about 36 to about 45 mm, and the warm composition can be spread without tearing, which results in a dense, defect-free plate after curing.

Care should be taken not to vacuum mix for an excessive amount of time since an unsatisfactory mixture will result. Casting compositions vacuum mixed for 20 to 30 minutes at 40° C. will pelletize due to the large liquid loss, resulting in penetration depth values of 1 to 25. This renders the composition unusable for casting because there is insufficient liquid binder phase to wet and bond all of the particulate constituents.

Too much liquid is also detrimental to the cured casting quality. Casting compositions which contain more than about 18% final liquid content, have penetration depth values greater than 60 and are prone to gross blistering and cracking during the cure. These defects are created by volatile release and are exaggerated when a solid object, such as a steel plate used to weight the casting during cure, obstructs the primary path of gas release through the surface. Even with mixes that have higher penetration depths than 50 mm, defects allied to volatile release are evident on a lesser scale. In addition, excess liquid content may, under some circumstances, result in a defect-free but incompletely cured plate which will exhibit blistering and cracking during high-temperature heat treatment, vis. baking.

Filling the mold may be accomplished by hand, mechanical means, injection, or with pressure or vacuum. Compaction to eliminate voids and maximize plate density may be promoted by vibration, ultrasonics, centrifugal force, pressure or other similar means. A particularly effective technique is to fill the warm mold by trowel, then screed the surface with a steel bar to which a vibrating motor has been attached. Pressure is then applied during cure by placing steel weights on the wet mix.

Such techniques or combinations of techniques, e.g. applying pressure while vibrating the molding composition, may prove especially effective in the case of high viscosity compositions such as those whose penetration depth ranges between that of a room temperature, vacuum-mixed composition and a composition which has been vacuum mixed for such a long period as to lose general cohesion. In this range, typically 25 to 30 mm penetration depth, as defined by the ASTM measurement procedure described in Example 11, use of these special techniques may enable one to successfully apply the molding composition and obtain a plate with acceptable quality.

The mixed material may be spread on a flexible substrate such as aluminum foil and then folded or bent into the desired shape. This is an ideal approach when it is desired to fit the plate material over a highly contoured surface.

A heat treatment cycle similar to that shown in FIG. 1 may be used to cure the liquid containing formulations. Accelerated cure cycles are possible with a heating system such as microwave is used to heat the molded material from within, instead of from the exterior as in a hot air oven. With microwave curing it is possible to reduce all of the heating times in FIG. 1 by as much as a factor of eight. When curing large flat plates, it may be necessary to maintain a flattening pressure on the plate material during the cure process (e.g., place a heavy flat plate on top of the molded material).

For certain applications it may not be necessary to further heat the cured plates. If, however, carbonization is required, then the preferred temperature range for baking the plate material is 800° to 1000° C. Temperatures above 1000° C. are not preferred and graphitizing temperatures must be avoided. The baking process should be carried out in an inert atmosphere, coke bed or similar protective environment to prevent excessive air burn. A higher degree of plate flatness may be achieved by pressing the plate between two flat surfaces during the baking process. The heat up and cool down periods may be as short as one hour, with 24 hours being preferred.

The plates may be attached to the cathode blocks (1) before the blocks are shipped to the smelter, (2) at the smelter but before the cathode is assembled, or (3) after the cathode has been assembled. In each case, a simple commercially available carbon cement can be used as adhesive. UCAR C-34 cement is a preferred carbon cement for affixing the plates to the carbon cathode substrate. The preferred process comprises placing a weight on each plate to maintain compression on the glue joint during cure of the cement, and heating the block and the plate to a temperature of from about 30° C. to about 40° C. prior to application of the adhesive and joining of the process. After cure of the cement at the prescribed temperature (about 125° to about 135° C. is typically recommended for UCAR-34 cement), all conventional cell construction and start-up procedures can be followed without modification.

The area covered with the plate material can range from the entire inner surface of the cathode cavity to less than 10 percent of the cathode surface below the anode or anodes. The preferred area to be covered ranges from the entire cathode surface directly below the anode or anodes to 50 percent of said area, with the ideal ranging from 90 percent to 100 percent of said area. It may be necessary to leave some small gaps or slots to permit cathode ram degassing and accommodate cathode block movements during cell heat-up and start-up.

The plate material need not be continuous over the entire cathode surface. In the case of $TiB_2$ plates, small gaps between adjacent plates (1 to 5 mm) will be bridged by the molten metal. Similarly, $TiB_2$ particles in a carbon surface at an appropriate density will produce a pseudo-continuous aluminum wetting film by bridging between adjacent $TiB_2$ particles. In the case of the $TiB_2$/carbon composition, about 20 weight percent, $TiB_2$ in the surface will produce a pseudo-aluminum wetted surface with a most preferred overall $TiB_2$ content in the surface layer of 35–70 weight percent to maximize wetting and to allow for mixing inhomogeneities and a viable coating life. Modification of the $TiB_2$ particle properties and/or changing the plate formulation and/or the $TiB_2$ distribution within the coating may enable the use of lesser amounts of $TiB_2$. Gaps between the plates should be 5 mm or less in width with the preferred being 1 mm or less.

There is no minimum or maximum plate thickness. Generally, the thicker the plate, the longer the plate life. However, the greater the thickness, the greater the initial cost. The preferred plate thickness is from 0.8 to 1.75 cm to minimize the tendency for blistering or warping of the plate. Maximum plate thickness should be consistent with anticipated cell life, i.e., there is no need to have a plate thickness to last 10 years if cell life is anticipated to be only 7 years. Moreover, plates may be "layered" to achieve thicker surfaces as required.

The following examples demonstrate the improved process for producing aluminum wettable, RHM-containing plates which constitutes the present invention. For clarity in demonstrating the improvement obtained, comparative examples are also set forth (Examples 1–4, in accordance with the teachings of Boxall, Ser. No. 576,835 (abandoned, continued as Ser. No. 729,888). Examples 5 through 10 demonstrate the effects that variations in liquid content, temperature, and mixing method have on the viscosity and workability of the casting composition, and ultimately on the quality of the cathode plates produced. Example 11 sets forth the measurement technique utilized in determining penetration depth in accordance with ASTM method C 360-63. In addition, Examples 12–17 demonstrate the measurement of penetration depth values for the molding composition, and illustrate suitable values and the criticality thereof.

EXAMPLE 1 (comparative)

The following formulation was successfully cast and cured using a variety of mold materials.

Formulation (initial weight, as weight percent)

44.6% $TiB_2$ powder
27.5% UCAR C-34 solids
15.5% UCAR C-34 liquid
12.1% UCAR BB-6 Graphite particles
0.3% Great Lakes Fortafil 3 carbon fiber, sized for UCAR C-34, 0.32 cm. long

| Molds | Material | Size | Depth Filled |
| --- | --- | --- | --- |
| | Styrofoam | 5.1 cm diameter | 1.4 cm |
| | Waxed paper | 5.1 cm diameter | 1.4 cm |
| | Polypropylene | 6.7 cm diameter | 1.3 cm |
| | Cardboard | 7.6 × 8.3 cm | 1.9 cm |

The cure cycle shown in FIG. 1 was used to cure the four test samples. The cured test samples were cut in half and one portion of each test sample, including its mold material, was baked at 1000° C. in an argon atmosphere over a 24 hour period. After cooling, it was observed that the styrofoam had been converted to a non-adherent dust, the polypropylene had essentially disappeared, and the waxed paper and cardboard were charred. The resulting test cathode plate materials appeared identical to those surface layers formed by the prior art technique of coating directly on carbon cathode blocks.

EXAMPLE 2 (comparative)

The attachment process to the cathode was tested by gluing the remaining baked portion of the styrofoam mold test sample to a piece of SK cathode block using UCAR C-34 cement. The UCAR C-34 cement was mixed, applied and cured over a temperature cycle up to 135° C. as per manufacturer's instructions. After cooling, the test sample could not be detached from the SK block by hand pressure.

A voltage drop of 0.1 V, was measured when a direct current of 0.7 A/cm$^2$ was passed across the cured glue joint after cooling to room temperature. After heating the glued assembly to 1000° C. in an argon atmosphere over a 24 hour period, and then cooling to room temperature, the voltage drop across the glue joint was less than 0.001 V. The current density of 0.7 A/cm$^2$ across the glue joint is approximately the maximum which would be encountered in a conventional coke bake and in the normal operation of a commercial cell. Even the initial 0.1 V voltage drop across the cured glue joint will not adversely effect the coke bake procedure used to start up a new cell.

The test sample could only be fractured from the SK block by striking the sample strongly 4 times with a hammer to cause a shearing force on the baked glue joint. Hammer blows perpendicular to the glue joint had no observable effect on the integrity of the glued assembly. Large horizontal shearing forces would not be normally encountered in the operation of a cell. The failure occurred within the glue joint, not at either bonding surface. Applying pressure while curing the cement joint decreases the thickness of the glue line and increases its strength. In practice, a weight can be placed on top of each glued plate during the glue cure cycle to achieve the optimum glue joint.

EXAMPLE 3 (comparative)

A steel mold, 30.5×30.5×0.95 cm deep was fabricated, and FREKOTE mold release was applied to the mold. Approximately 2000 g of the composition described in Example 1 was placed in the mold, spread and levelled off. The mold was placed on a vibrating table and vibrated for 5 minutes. Vibration seemed to have little effect on the casting except at the edges, where liquid appeared to separate and lie on the surface. The cast surface was smoothed by trowel during vibration, which was significantly more effective than trowel smoothing on a static mold.

The tile was cured according to the cycle given in FIG. 1. No major defects were apparent following the cure except for some minor warping. Each corner of the tile was approximately 3 mm higher than the center when measured against a flat surface. This warpage occurred during the 150° C. stage of the cure cycle. No blisters or cracks were evident, but the tile porosity was about the same as seen in comparable direct spread cathode coatings of the prior art. The bottom of the vibrated tile was quite smooth in contrast to the irregular top surface, which retained the appearance of the wet mix as trowelled.

EXAMPLE 4 (comparative)

2000 g of the material described in Example 1 was placed in the 30.5×30.5×0.95 cm steel mold and spread without using the vibrating table of Example 3. The cast surface was struck off with a screed bar and smoothed. A piece of KRAFT paper level with the top of the mold was used to cover the cast material and two 30.3×30.3×0.65 cm steel plates of approximate total weight 20 lbs. were placed on top. The sample was cured in the normal manner, then cooled and inspected. The KRAFT paper had adhered to the tile surface but the steel plates were easily removed without sticking.

The weights had restricted warpage to a large extent since the tile corners were no more than 1.0 mm higher than the tile center. This warpage is easily accommodated by the glue joint when cementing to the cathode block. No defects such as blisters or cracks were evident, and the normal amount of porosity and small lateral striations were observed. The tile was heat treated to about 1000° C. over a 24 hour period in an argon atmosphere. No defects were noted and the paper adhering to the tile had absorbed resin and carbonized to a brittle, flakey material which could be brushed from the tile surface.

EXAMPLE 5

6500 g of the material described in Example 1 was blended in a Ross LDM-2, double planetary mixer for approximately 20 minutes under a vacuum of 29.5 mm Hg. The material was cast in two steel molds, one measuring 30.5×30.5×0.95 cm, the other 30.5×30.5×1.90 cm. Both molds were treated with PEN mold release agent. The vacuum-mixed composition had a slightly more butter-like, less sticky consistency than conventionally mixed compositions. A styrofoam sheet was placed over each of the samples and 20 lbs. of steel weight was set on top of this for the 0.95 cm deep casting. A porous refractory alumina frit on top of the styrofoam was used to weight the 1.90 cm sample. Both tiles were cured using the usual cure cycle. When inspected it was seen that the styrofoam sheet had melted, causing the steel plates and frit to adhere to the cast tile surfaces. By contrast, both tiles released cleanly from the mold cavities. The 0.95 cm cast tile would not debond from the steel plate and had to be broken off in pieces. When these pieces were sectioned, cleaned, and examined, it was evident that porosity had decreased dramatically from the level seen in coatings mixed at atmospheric pressure. Virtually all of the small voids and cracks typically seen in a prior art cathode coating or a conventionally mixed cast plate had been eliminated by vacuum degassing.

The 1.90 cm tile was separated from the frit intact and was examined. No surface defects or warpage were noted. This tile was then heat-treated to about 850° C. over a 10 hour period in an argon atmosphere, furnace cooled, cross-sectioned and examined. Some small and shallow "fish scale" type cracks were found on the top and bottom surfaces, which appear to be related to the mold-filling procedure. On the other hand, the heat-treated tile was free of the macroscopic porosity characteristic of cast tiles and cathode coatings fabricated from materials mixed at atmospheric pressure. After baking, a small crack was present but the "folded" appearance of the defect suggested that it was also mold-filling related and therefore remediable.

The high viscosity of the casting composition after vacuum mixing can prevent thorough spreading and smoothing of the mixture. Warming the mold and/or the composition has proven to be an effective technique for lowering the viscosity of the composition, which circumvents this problem. Warming the composition during mixing may also enhance the effects of vacuum mixing.

EXAMPLE 6

5000 g of the material described in Example 1 was blended in the Ross LDM-2 mixer for approximately 10 minutes. The mixing bowl had been preheated to approximately 40° C. prior to blending. The composition was examined and worked with a trowel and it was apparent that the viscosity had decreased from the levels associated with mixing at room temperature. The material was then mixed for approximately 11 minutes under a vacuum of approximately 29.5 mm Hg. The vacuum-mixed composition had developed a slightly higher viscosity, but not as high as conventionally-mixed compositions with comparably reduced mix-liquid content.

The contents of the mixer were weighed and it was found that 4933 g remained. This indicated a liquid loss of 67 g or 8.7 percent of the original liquid content. Conventionally mixed compositions exhibit negligible liquid loss during blending.

EXAMPLE 7

6500 g of the material described in Example 1 was heated and vacuum-mixed as described in Example 6. A quantity of the material was placed in a steel mold of dimensions 28.8×28.8×1.0 cm which had been preheated to approximately 40° C. The warm mold prevented the casting composition from cooling, resulting in relatively easy application. The material was spread and worked without difficulty. When molds at room temperature are used with similar warmed compositions, the material is rapidly cooled by the mold and develops a higher viscosity. The material then becomes sticky and difficult to work. The molding composition is then torn and folded into position rather than flowing to some extent in the mold. These incipient flaws developed during mold-filling manifest themselves as small vertical cracks and "fish scale" cracks after curing.

EXAMPLE 8

After the composition described in Example 7 was cast and spread in the mold, it was levelled with a vibrating screed bar. The screed bar fabricated for this purpose was a strip of TEFLON coated steel plate of dimensions 7.60×76.0×0.64 cm, with a small vibrating motor attached. The screed bar was moved across the surface of the mold, levelling the composition and striking off any excess material. The vibrating action prevented "tearing" of the composition and facilitated pushing across the surface. When a conventional screed bar without a vibrating motor was used, the cast material tended to stick to it, creating voids, depressions and other surface defects, and even lifted the castable from the mold. During cure, such surface defects, tearing, etc., can develop into cracking.

EXAMPLE 9

The cast plate described in Example 8 was weighted during the cure cycle with two 0.65 cm thick steel plates weighing a total of approximately 20 lbs. A piece of 0.15 cm TEFLON sheet was glued to the bottom steel plate where it contacted the cast mixture. After curing, the weighting plates were removed without difficulty, and the TEFLON covered plate left a smooth, flat finish on the surface of the plate.

In previous attempts, weighting the tile with a loose piece of TEFLON sheet between the casting and the steel weights was less successful, since the TEFLON sheet itself warped during the cure, creating waves and depressions on the surface of the tile. Styrofoam sheet was not wholly satisfactory as a separator medium, due to the sticky polymer residue remaining on the surface of the plate after cure, which made tile ejection difficult and provided a residue on the surface that was hard to remove even after high temperature heat treatment.

Steel weighting plates treated with a mold release agent such as FREKOTE or MOLD WIZ F-57 have been used successfully. A steel plate coated with mold release was used to weight a casting made in the manner described in Example 8. After curing, the plate was removed from the cast tile with a minimum of effort.

Steel plates which have not been treated with a release agent adhere tenaciously to the cast tile and have to be pried or chipped off, frequently destroying the tile in the process.

EXAMPLE 10

Shrinkage can be controlled by varying the binder and aggregate content of the casting composition. The dimensions of the cast tile described in Example 8 were measured after curing the baking. These measurements indicated a shrinkage of 1-2 percent in the lateral direction (the plane of the plate) and 8-12 percent in ther vertical direction. Using such experimentally determined percentages, a mold may be fabricated to make any size tile required.

The following composition was mixed:
44.6% $TiB_2$ powder
13.8% UCAR C-34 solids
15.5% UCAR C-34 liquid
25.8% UCAR BB-6 graphite particles
0.3% Great Lakes Fortafil 3 carbon fiber, sized for UCAR C-34, 0.32 cm long The material was mixed conventionally and cast in a 30.5×30.5×0.95 cm mold. The casting method described in Example 3 was utilized and it was found that the material was difficult to spread and work.

After curing, it was apparent that essentially no shrinkage had occurred, and the tile had adhered to the mold sides and bottom. The tile had to be chipped out of the mold with a hammer and chisel. Accordingly, a certain amount of shrinkage is considered desirable to counteract adhesion to the mold and to allow tile ejection.

A composition containing less BB-6 carbon additive, and more UCAR C-34 solids, was made and is described below.
44.6% $TiB_2$ powder
20.6% UCAR C-34 solids
15.5% UCAR C-34 liquid
19.0% UCAR BB-6 graphite particles
0.3% Great Lakes Fortafil 3 carbon fiber, sized for UCAR C-34, 0.32 cm long This composition was mixed conventionally and was cast in a 30.5×30.5×0.95 mold. The composition consistency and viscosity were much the same as the formulation described in Example 1.

After curing it was evident that tile shrinkage was still slight. Shrinkage was marginally greater than that of the previous example but not as great as the composition described in Example 1. The tile was ejected from the mold, intact, with some effort.

It is apparent, therefore, that increased percentages of C-34 solids together with decreased aggregate content lead to greater tile shrinkage. This offers a fine tuning mechanism with which to control dimensional changes during cure.

EXAMPLE 11

The composition described in Example 7 was vacuum-mixed using a cold trap to collect harmful vapors and protect the vacuum pump. The cold trap comprised a container filled with dry ice surrounded by a coaxial vacuum chamber of slightly greater diameter, connected between the vacuum pump and the Ross mixer. When the mixing container is evacuated, the furfuryl alcohol (mix liquid) vapor passes over to the trap and condenses on the surface of the inner dry-ice chamber to the cold trap, and subsequently settles to the bottom of the outer chamber after the dry ice has melted and the vacuum has been released. In this manner harmful materials are prevented from reaching the vacuum pump and causing damage by fouling the vacuum oil, attacking seals, causing deposition on valve seats, etc. This is important for continuous use of vacuum equipment as vacuum pump rebuilding or replacement can cause delays and unnecessary expense. Before starting the next batch run the vacuum is released, the inner chamber allowed to warm to room temperature, and the liquid in the bottom of the cold trap is drawn off before inserting further dry ice.

As previously indicated, viscosity of the composition is a critical factor, and control of vacuum treatment and liquid removal during blending by penetration depth criteria offers a convenient and accurate method to obtain the optimum results.

The workability, curing and baking properties of a cast plate mixture are related to the mix liquid content, temperature, and mixing method, and, hence, the viscosity of the casting composition. If the composition is too viscous (low liquid content), the casting mix will be difficult to spread and application-related defects, such as vertical cracks or scaling, will occur where the mix is pulled apart during spreading. An extreme situation is reached when the liquid content becomes so low that there is insufficient binder to hold the solid particles together in the cured or baked product. If the casting composition is too fluid (high liquid content, low viscosity), all of the volatiles created during the cure will not be able to escape and defects such as large-scale cracking and blistering will result. This may result partially from excess resin which seals the structure during cure, closing off gas escape channels and causing internal pressure to build up. Also, the resin portion of the mix is subject to the greatest mass loss during cure. Thus, any excess over the critical maximum resin content shall produce volumetric shrinkage as well as large volumes of gas.

Viscosity may also be lowered without altering the liquid content by warming the casting composition. This may eliminate any application-related defects associated with the high viscosity cold blend and thereby give satisfactory cure and bake. The relative viscosity of the as-mixed composition upon casting is therefore a key parameter in determining the viability of successfully processing and molding said mix. Measurement of viscosity of coating compositions utilized herein is highly difficult due to the very viscous nature thereof. Accordingly, an alternative approach has been taken. Applying the novel penetration depth criterion of the present invention has the unobvious and unanticipated benefit of defining the ideal balance between spreading and bonding properties, on the one hand, and viable processing parameters on the other. The novel utilization of penetration depth measurements has now been found to experimentally correlate not only with mold flow properties, but with gas release during heat treatment, self-bonding of the castable, mold-filling related defects, and product density and quality.

The viscosities of several different cathode plate casting compositions were evaluated through the use of an ASTM Standard Test Procedure. This method, ASTM C 360-63, was developed to determine the penetration depth of a steel weight into fresh concrete, a material having viscosity characteristics similar to those of the casting mix of the present invention. Various carbon/-$TiB_2$ casting compositions were substituted for the concrete and the test performed according to ASTM specifications, with satisfactory results.

The testing apparatus consists of a steel cylinder with a hemispherically shaped bottom and handle weighing a total of 30 pounds (14 kg). The hemisphere radius is 76 mm and a stainless steel stirrup is used to guide the penetration assembly and to serve as a reference for measuring penetration depth.

A quantity of each material, sufficient to fill a container 610 mm in diameter and 200 mm deep, was mixed. The casting compositions were placed in the container and levelled with a hand trowel. The penetration apparatus and stirrup were placed on the surface of the mixture and the graduated handle adjusted so that the zero point coincided with the top edge of the stirrup when the weight was just touching the casting material. The weight was released, and the penetration depth recorded after it had come to rest. Three measurements were made and an average penetration depth for each composition is reported in Table 1, as is a summary of defects found in plates made from each composition.

EXAMPLE 12

The composition set forth in Example 1 was tested:
44.6% TiB$_2$ powder
27.5% Union Carbide C-34 Cement Solids
15.5% Union Carbide C-34 Cement Liquid
12.1% Union Carbide BB-6 Graphite Aggregate
0.3% Great Lakes Fortafil 3 Carbon Fiber, Sized For UCAR C-34, 0.32 cm long The components were blended in a Ross LDM 2 double planetary mixer, for 10 minutes at room temperature. Penetration testing was also performed at room temperature (20° C.).

EXAMPLE 13

The composition tested is the same, but the components were mixed and tested at 40° C.

EXAMPLE 14

The composition contains the same components as Examples 1 and 2, but was pre-mixed conventionally for 10 minutes in the double planetary mixer, then mixed under vacuum for an additional 8 minutes. All mixing and penetration testing were performed at room temperature.

EXAMPLE 15

The composition contains the same ingredients, and was mixed in a manner similar to Example 14, except that mixing the testing were performed at 40° C.

EXAMPLE 16

The composition was again the same, and was mixed in the same manner as Example 15 (heat and vacuum), except that it was mixed under vacuum for 30 minutes rather than 8 minutes. The resulting material comprised an agglomeration of small, dry lumps totally unsuited to spreading, but which could be packed successfully to form a plate.

EXAMPLE 17

The composition contained the following:
44.6% TiB$_2$ powder
24.1% Union Carbide C-34 Cement Solids
21.0% Union Carbide C-34 Cement Liquid
10.0% Union Carbide BB-6 Graphite Aggregate
0.3% Great Lakes Fortafil 3 Carbon Fiber, Sized for UCAR C-34, 0.32 cm long The components were blended in the double planetary mixer for 10 minutes at room temperature. The material was also tested at room temperature.

The viscosity of each composition is reflected in the depth of penetration. Greater penetration depths imply reduced viscosities and/or higher liquid content. Table 1 sets forth the results of Examples 12 through 17.

TABLE 1

| Example # | Penetration Depth (mm) | Temperature (°C.) | Initial Percentage of Mix Liquid | Conventionally Mixed (C) or Vacuum Mixed (V) | Defects in Plates* |
| --- | --- | --- | --- | --- | --- |
| 12 | 50.8 | 20 | 15.5 | C | P, S, C |
| 13 | 55.6 | 40 | 15.5 | C | P, S |
| 14 | 34.9 | 20 | 15.5 | V (8 min) | C |
| 15 | 38.1 | 40 | 15.5 | V (8 min) | None |
| 16 | 1.6 | 40 | 15.5 | V (30 min) | L |
| 17 | 203.2 | 20 | 21.0 | C | P, S, B |

*P = Porosity
S = Striations
C = folding and/or fish-scale cracking
L = loss of cohesion
B = Blisters On the scale defined by the ASTM Standard, penetration values for castable mixtures which yield acceptable final plate structures may range from about 25 to about 50 mm. At lower values the composition is prone to pelletizing, which precludes effective spreading, while at higher values the resulting cured plate exhibits small horizontal striations and a certain degree of internal porosity.

A range of from about 30 to about 45 is preferred because casting compositions within this range produce denser tiles with fewer, smaller defects. The most preferred penetration range for quality control, which essentially guarantees good spreading, a high density, and defect-free product is from about 36 to about 40 mm. Compositions with values at the upper limits of this range will exhibit improved spreading properties while an extra "margin-of-safety" can be obtained by sacrificing some workability and utilizing compositions towards the lower end.

It is to be understood that the above description of the present invention is susceptible to adaptations, modifications, and changes by those skilled in the art, and that the same are intended to be considered to be within the scope of the present invention, which is set forth in the appended claims.

What is claimed is:

1. A method for producing an aluminum-wettable element which comprises:
   (a) preparing a homogeneous molding composition of Refractory Hard Material, carbonaceous filler, carbonaceous additive, and thermosetting binder system, said binder system having a char yield of greater than 25 percent, wherein said filler comprises carbonaceous material smaller than 100 mesh and said additive comprises carbonaceous material selected from the group consisting of carbon particles having a size of greater than 100 mesh, and carbon fibers, and mixtures thereof;
   (b) vacuum-mixing said composition for at least 5 minutes to achieve a penetration depth of from about 25 mm to about 50 mm; and
   (c) molding and heating said composition to form a monolithic element comprising Refractory Hard Material in a high density carbonaceous matrix bonded by amorphous carbon.

2. The method of claim 1, further comprising the step of premixing the molding composition for sufficient time to achieve essentially complete wetting of all solid materials and uniform dispersion thereof prior to commencing vacuum-mixing.

3. The method of claim 2, wherein said molding composition is heated during said premixing step.

4. The method of claim 1, wherein said molding composition is heated during said vacuum-mixing step.

5. The method of claim 4, wherein said molding composition is premixed to achieve thorough wetting of all solid materials prior to commencement of vacuum-mixing.

6. The method of claim 5, wherein said molding composition is heated during said premixing.

7. The method of claim 6, further comprising heating the mold prior to molding said molding composition.

8. The method of claim 1, wherein the penetration depth of the molding composition has a value of from about 30 mm to about 45 mm.

9. The method of claim 8, wherein the penetration depth is from about 36 mm to about 40 mm.

10. The method of claim 8, wherein said Refractory Hard Material is selected from the group consisting of borides, carbides, silicides and nitrides of elements in Group IV to VI to the Periodic Table.

11. The method of claim 10, wherein said Refractory Hard Material is selected from the group consisting of titanium diboride, titanium carbide, zirconium diboride, zirconium carbide and mixtures and alloys thereof.

12. The method of claim 11, wherein said Refractory Hard Material is titanium diboride.

13. The method of claim 12, wherein said titanium diboride comprises from about 20 to about 70 percent by weight of the molding composition.

14. The method of claim 12, wherein said titanium diboride comprises from about 30 to about 60 percent by weight of the molding composition.

15. The method of claim 8, wherein the binder is selected from the group consisting of phenolic, furane, polyphenylene, heterocyclic, epoxy, silicone, alkyd, and polyimide resins, and mixtures and copolymers thereof.

16. The method of claim 15, wherein said binder system has a char yield of greater than about 50 percent.

17. The method of claim 8, wherein the molding composition consists of from about 20 to about 70 percent by weight titanium diboride, from about 1 to about 60 percent by weight carbonaceous filler and additive, and from about 20 to about 60 percent by weight thermosetting binder system having a char yield of greater than 25 percent.

18. The method of claim 1, wherein said vacuum-mixing reduces the liquid content of said composition by from about 5 percent to about 10 percent, based on initial liquid content.

19. The method of claim 18, wherein the mold is preheated prior to the composition being placed therein.

20. The method of claim 19, wherein the mold is subjected to vibration.

21. The method of claim 18 wherein the dimensional stability of said monolithic element is maintained during cure and bake by weighting the surface.

22. A method for producing an aluminum-wettable aluminum reduction cell cathode surface which comprises;
(a) preparing a homogeneous molding composition of Refractory Hard Material, carbonaceous filler, carbonaceous additive, and thermosetting binder system, said binder system having a char yield of greater than 25 percent, wherein said filler comprises carbonaceous material smaller than 100 mesh and said additive comprises carbonaceous material selected from the group consisting of carbon particles having a size greater than 100 mesh, and carbon fibers, and mixtures thereof;
(b) mixing said composition under vacuum for at least five minutes to achieve a penetration depth in said composition from about 25 mm to about 50 mm;
(c) molding and heating said composition to form a monolithic element comprising Refractory Hard Material in a high density carbonaceous matrix bonded by amorphous carbon; and
(d) adhering said element to a cathode substrate.

23. The method of claim 22, further comprising the step of premixing the molding composition for sufficient time to achieve essentially complete wetting of all solid materials and uniform dispersion thereof prior to commencing vacuum-mixing.

24. The method of claim 23, wherein said molding composition is heated during said premixing step.

25. The method of claim 22, wherein said molding composition is heated during said vacuum-mixing step.

26. The method of claim 25, wherein said molding composition is premixed to achieve thorough wetting of all solid materials prior to commencement of vacuum-mixing.

27. The method of claim 26, wherein said molding composition is heated during said premixing.

28. The method of claim 27, further comprising heating the mold prior to molding said molding composition.

29. The method of claim 22, wherein the penetration depth is from about 30 mm to about 45 mm.

30. The method of claim 29, wherein the penetration depth is from about 36 mm to about 40 mm.

* * * * *